United States Patent
Menon et al.

(10) Patent No.: US 9,439,078 B2
(45) Date of Patent: Sep. 6, 2016

(54) COOPERATIVE INTERFERENCE SUBTRACTION SCHEME

(71) Applicant: EDEN ROCK COMMUNICATIONS, LLC, Bothell, WA (US)

(72) Inventors: Rekha Menon, Bothell, WA (US); Eamonn Gormley, Bothell, WA (US); Chaz Immendorf, Bothell, WA (US)

(73) Assignee: Spectrum Effect, Inc., Seattle, WA (US)

( * ) Notice: Subject to any disclaimer, the term of this patent is extended or adjusted under 35 U.S.C. 154(b) by 279 days.

(21) Appl. No.: 14/210,172

(22) Filed: Mar. 13, 2014

(65) Prior Publication Data

US 2015/0016429 A1 Jan. 15, 2015

Related U.S. Application Data

(60) Provisional application No. 61/845,346, filed on Jul. 11, 2013.

(51) Int. Cl.
| | | |
|---|---|---|
| *H04W 16/14* | (2009.01) | |
| *H04J 11/00* | (2006.01) | |
| *H04W 28/18* | (2009.01) | |
| *H04L 1/00* | (2006.01) | |
| *H04B 17/345* | (2015.01) | |

(52) U.S. Cl.
CPC ............ *H04W 16/14* (2013.01); *H04J 11/005* (2013.01); *H04J 11/0056* (2013.01); *H04B 17/345* (2015.01); *H04L 2001/0093* (2013.01); *H04W 28/18* (2013.01)

(58) Field of Classification Search
None
See application file for complete search history.

(56) References Cited

U.S. PATENT DOCUMENTS

| | | | |
|---|---|---|---|
| 8,170,487 B2 | 5/2012 | Sahota et al. | |
| 2007/0165569 A1* | 7/2007 | Kaminski | H04W 16/10 370/329 |
| 2008/0002628 A1* | 1/2008 | Bi | H04W 36/0083 370/335 |
| 2010/0061315 A1* | 3/2010 | Cordeiro | H04W 72/082 370/329 |
| 2011/0021153 A1 | 1/2011 | Safavi | |
| 2012/0087406 A1 | 4/2012 | Lim et al. | |
| 2012/0088535 A1* | 4/2012 | Wang | H04B 7/024 455/513 |
| 2013/0182583 A1* | 7/2013 | Siomina | H04W 24/10 370/252 |

FOREIGN PATENT DOCUMENTS

| | | |
|---|---|---|
| JP | 2010/103682 A | 5/2010 |
| KR | 10-2011-0000676 A | 1/2011 |

OTHER PUBLICATIONS

International Search Report and Written Opinion for PCT/US2014/026801, filed Mar. 13, 2014.

* cited by examiner

*Primary Examiner* — Mounir Moutaouakil (57) ABSTRACT

A cooperative interference subtraction scheme includes receiving a first baseband signal including an interference signal at a first base station, receiving a second baseband signal including the interference signal at a second base station, calculating a channel translation parameter based on the first baseband signal and the second baseband signal, receiving a signal including a user equipment (UE) transmission at the first base station during a first time slot, and subtracting interference from the signal including the UE transmission using the channel translation parameter.

17 Claims, 5 Drawing Sheets

COOPERATIVE INTERFERENCE SUBTRACTION SCHEME

CROSS-REFERENCES TO RELATED APPLICATIONS

The present invention claims priority to U.S. Provisional Application No. 61/845,346, filed Jul. 11, 2013, which is incorporated by reference herein for all purposes.

BACKGROUND OF THE INVENTION

Wireless network operators pay large amounts of money to license wireless spectrum for their networks. Therefore, operators carefully locate base stations and configure radio parameters to maximize the usage efficiency of the available spectrum. However, unlicensed users operate devices that cause interference to the licensed base stations. Interference degrades the performance of licensed equipment, resulting in poor quality voice calls, dropped calls, a reduction in throughput in data networks, etc. A single interferer may affect multiple base stations, which could cause a substantial degradation in network performance.

BRIEF SUMMARY OF THE INVENTION

Embodiments of the present disclosure address scenarios where an external interferer affects multiple base stations. In particular, embodiments are directed to a system and method to detect interference and utilize interference information collected at multiple base stations to reduce the impact of interference on network performance.

In an embodiment, measurements of the interference signal at base stations affected by the interferer are sent over a backhaul portion of a network and used to reconstruct the interference signal at the target base station. The interference signal can then be subtracted from a total received signal at the target base station to recover information transmitted to the target base station by mobile devices served by the target base station. Without such cooperation between base stations, interference subtraction can only be performed if the channel between the interferer and the target BS can be estimated, which is usually not possible with external interferers.

In an embodiment, subtracting interference in a wireless communications network includes receiving a first baseband signal including an interference signal at a first base station, receiving a second baseband signal including the interference signal at a second base station, calculating a channel translation parameter based on the first baseband signal and the second baseband signal, receiving a signal including a user equipment (UE) transmission at the first base station during a first time slot, and subtracting interference from the signal including the UE transmission using the channel translation parameter. The channel translation parameter may be a ratio between the first baseband signal and the second baseband signal. The first time slot may be a quiet time for the second base station.

In an embodiment, subtracting interference from the signal including the UE transmission includes reconstructing the interference signal by multiplying a signal received by the second base station during a quiet time for the second base station by the channel translation parameter and subtracting the reconstructed interference signal from the signal including the UE transmission.

Subtracting interference from the signal including the UE transmission may include receiving a signal including a UE transmission at the second base station during the first time slot, decoding a UE transmission received at the second base station, and subtracting the UE transmission from the signal including the UE transmission received by the second base station to create an interference signal, wherein the interference subtracted from the signal received at the first base station is a result of subtracting the UE transmission from the signal including the UE transmission received by the second base station.

In an embodiment, subtracting interference is facilitated by scheduling a quiet time at the first base station and the second base station, wherein the first and second baseband signals are received during the quiet time. Interference may be cancelled from the first baseband signal.

In an embodiment, a plurality of candidate base stations are evaluated, and one of the plurality of candidate base stations is designated as the second base station based on the results of the evaluation. In an embodiment, the signal including the UE transmission is decided, a UE transmission is reconstructed from the decoded signal, the reconstructed UE transmission is subtracted from the signal including the UE transmission to create a second interference signal, and the second interference signal is subtracted from a signal received at a third base station.

Subtracting interference may include calculating a second channel translation parameter for the second base station and a third base station, receiving a second signal from UE at the third base station, and subtracting interference from the second received signal using the second channel translation parameter.

In an embodiment, subtracting interference from the received signal is performed according to the following equation:

$$\overline{r_A(t_1)} = r_{A,UE}(t_1) + h_A I(t_1) + n_A(t_1) - \beta_{A,B} r_B(t_1) = r_{A,UE}(t_1) + \hat{n}_A(t_1)$$

in which $\hat{n}_A(t_1)$ represents noise due to the interference estimation process in addition to additive white Gaussian noise (AWGN) at the first base station, $r_{A,UE}(t_1)$ represents the signal from UE at time $t_1$, $h_A I(t_1)$ represents interference received by the first base station at time $t_1$, $n_A(t_1)$ represents noise received by the first base station at time $t_1$, $\beta_{A,B}$ is the channel translation parameter, and $r_B(t_1)$ represents a signal receive at the second base station at time $t_1$.

In an embodiment, the channel translation parameter is calculated according to the following equation:

$$\frac{r_A(t_q)}{r_B(t_q)} = \beta_{A,B}$$

in which $r_A$ is the first baseband signal, $r_B$ is the second baseband signal, and $\beta_{A,B}$ is the channel translation parameter.

DETAILED DESCRIPTION OF THE INVENTION

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
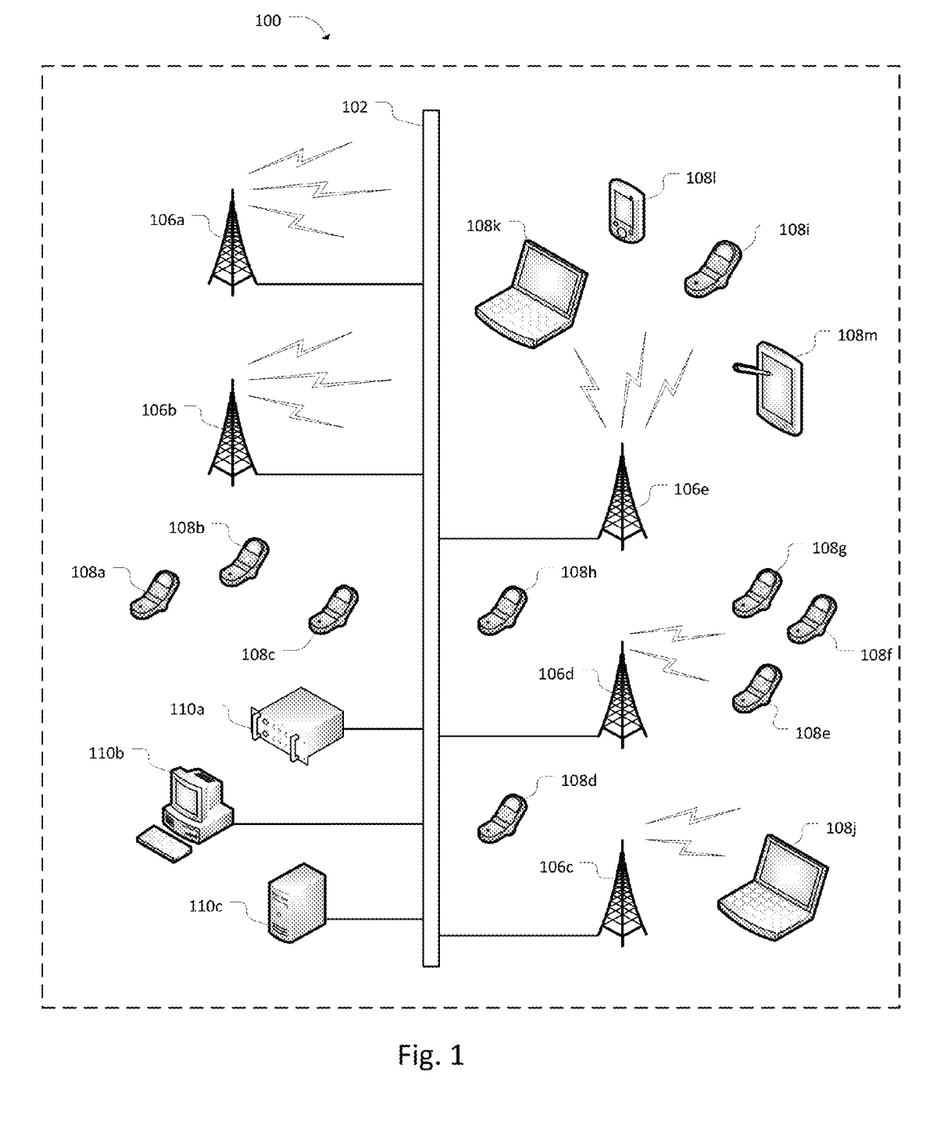
FIG. 1 illustrates a wireless communication system according to an embodiment.

FIG. 1 illustrates a networked computing system 100 according to an embodiment of this disclosure. As depicted, system 100 includes a data communications network 102, one or more base stations 106*a-e*, one or more network resource controller 110*a-c*, and one or more User Equipment (UE) 108*a-m*. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110*a-c* and any of the base stations 106*a-e*. Any of the network controller devices 110*a-c* may be a dedicated Network Resource Controller (NRC) that is provided remotely from the base stations or provided at the base station. Any of the network controller devices 110*a-c* may be a non-dedicated device that provides NRC functionality among others. The one or more UE 108*a-m* may include cell phone devices 108*a-i*, laptop computers 108*j-k*, handheld gaming units 108*l*, electronic book devices or tablet PCs 108*m*, and any other type of common portable wireless computing device that may be provided with wireless communications service by any of the base stations 106*a-e*.

As would be understood by those skilled in the Art, in most digital communications networks, the backhaul portion of a data communications network 102 may include intermediate links between a backbone of the network which are generally wire line, and sub networks or base stations 106*a-e* located at the periphery of the network. For example, cellular user equipment (e.g., any of UE 108*a-m*) communicating with one or more base stations 106*a-e* may constitute a local sub network. The network connection between any of the base stations 106*a-e* and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110*a-c* and/or base stations 106*a-e* may function independently or collaboratively to implement processes associated with various embodiments of the present disclosure.

In accordance with a standard GSM network, any of the network controller devices 110*a-c* (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110*a-c* (optionally having NRC functionality) may be associated with a NRC, a serving GPRS support node (SGSN), or any other common network controller device known in the art, such as an RRM. In accordance with a standard LTE network, any of the network controller devices 110*a-c* (optionally having NRC functionality) may be associated with an eNodeB base station, a mobility management entity (MME), or any other common network controller device known in the art, such as an RRM.

In an embodiment, any of the network controller devices 110*a-c*, the base stations 106*a-e*, as well as any of the UE 108*a-m* may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110*a-c*, or any of the base stations 106*a-e* may employ any number of common server, desktop, laptop, and personal computing devices.

In an embodiment, any of the UE 108*a-m* may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106*a-e*) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
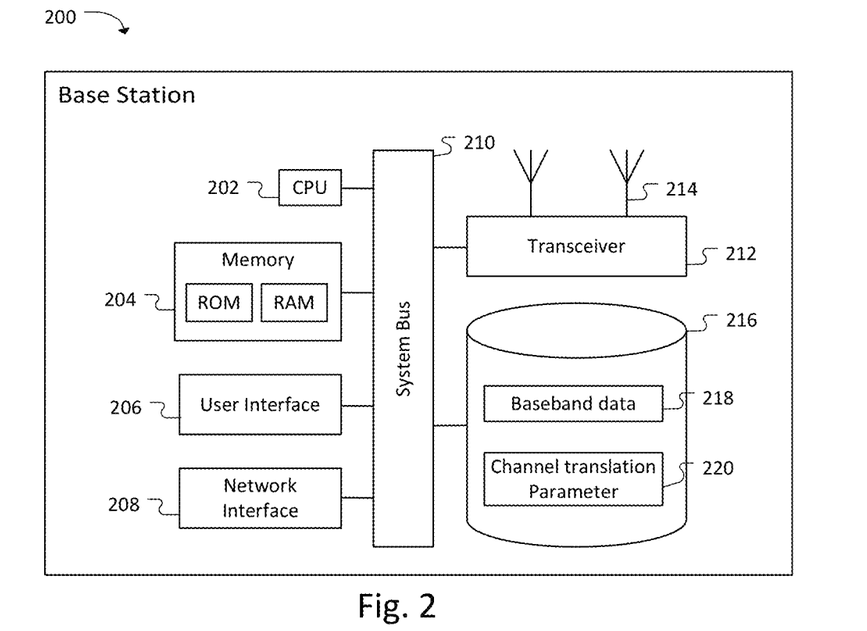
FIG. 2 illustrates a base station according to an embodiment.

FIG. 2 illustrates a block diagram of a base station 200 (e.g., a femtocell, picocell, microcell or macrocell) that may be representative of the base stations 106*a-e* in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send and receive scheduling information to and from an NRC, transmit signal data to an NRC, and share UE data with other base stations through network interface 208. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data storage 216 and CPU 202 which executes the program. In an embodiment, data storage 216 may store baseband data 218 and a channel translation parameter 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108*a-m* via any Cellular Data Communications Protocol, including any common GSM, UMTS, WiMAX or LTE protocol.

Figure 3:
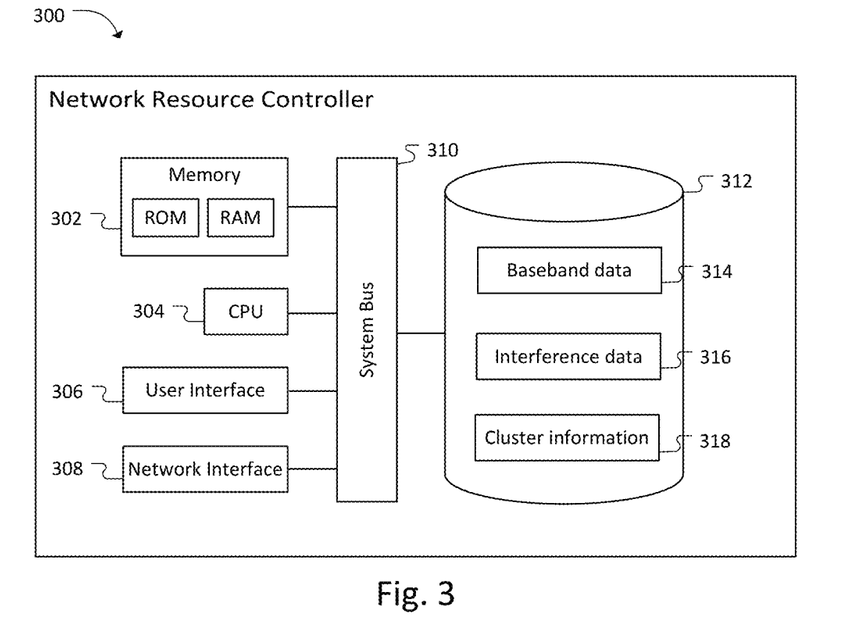
FIG. 3 illustrates a network resource controller according to an embodiment.

FIG. 3 illustrates a block diagram of an NRC 300 that may be representative of any of the network controller devices 110*a-c*. In an embodiment, one or more of the network controller devices 110*a-c* are SON controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may store baseband data 314, interference data 316, and cluster information 318. Cluster information 318 may include information related to a cluster of base stations involved in cooperative interference subtraction.

The NRC 300 may also include a user interface 306 that allows an administrator to interact with the NRC's software and hardware resources and to display the performance and operation of the networked computing system 100. In addition, the NRC 300 may include a network interface 306 for communicating with other components in the networked computer system, and a system bus 310 that facilitates data communications between the hardware resources of the NRC 300.

In addition to the network controller devices 110*a-c*, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Figure 4:
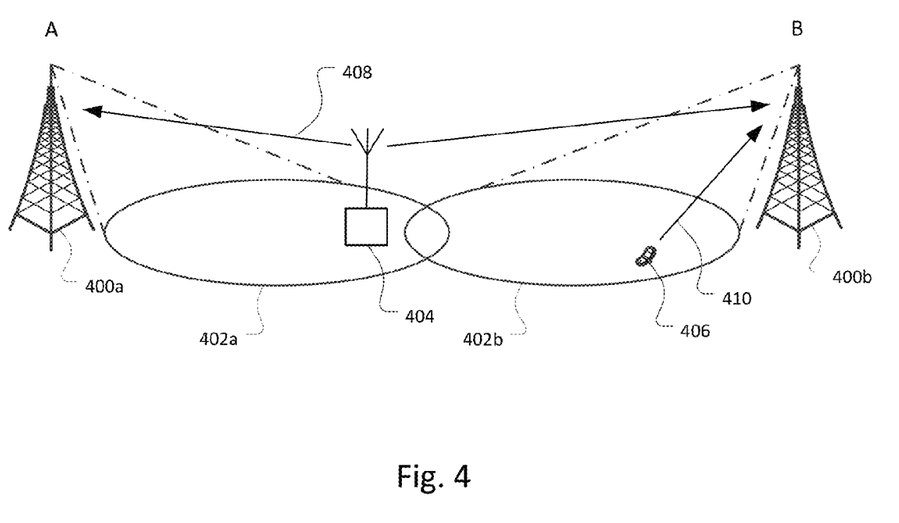
FIG. 4 illustrates an interference scenario according to an embodiment.

FIG. 4 illustrates an embodiment of an interference scenario. To help explain aspects of this disclosure, embodiments of a cooperative interference subtraction scheme will be described with respect to the interference scenario shown in FIG. 4.

In the scenario of FIG. 4, a first base station 400*a* and a second base station 400*b* are present in a wireless communications system. Although FIG. 4 shows a cell area 402*a* of first base station 400*a* overlapping cell area 402*b* of second base station 400*b*, aspects of this disclosure apply to other geographic orientations. In an embodiment, two or more base stations in a communications network that receive interference 408 from interference source 404 may employ aspects of a cooperative interference subtraction scheme.

In the scenario of FIG. 4, interference source 404 transmits interference 408 at frequencies used by UE 406 to transmit signal 410 to base station 400*b*. In other words, interference 408 exists in at least a portion of uplink frequencies detected by base stations 400*a* and 400*b*. The interference 404 may be entirely within the uplink frequency spectrum, or only a portion of interference may be in the uplink frequency spectrum.

Interference 408 from interference source 404 is received by base stations 400*a* and 400*b*. In an ideal scenario, interference source 404 is stationary. Optimal system performance may be achieved when the channel from the interferer is relatively constant across the period over which the cooperative interference subtraction process is carried out.

A quiet time is a time in which no transmissions occur in a set of frequencies for a given time between a base station and the UEs to which it is providing service. Quiet times may exist in one direction only (e.g., downlink quiet times for transmissions from a base station to its UEs and uplink quiet times for transmissions from UEs to their serving base station) or may exist in both directions. Quiet times may be shared by two or more base stations in a communications system. Quiet times may occur in an ordinary transmission schedule, or they may be deliberately scheduled by a system.

In the example of FIG. 4, a quiet time occurs in which no uplink transmissions are scheduled by base station 400a and base station 400b. During the quiet time, the signals seen at the base station receivers are the interference signal 408 plus thermal noise. The signal received at base station A in the quiet time may be expressed by the following Equation 1:

$$r_A(t_q) = h_A I(t_q) + n_A(t_q), \quad t_{qB} \leq t_q \leq t_{qE}$$ [Equation 1]

In Equation 1, $t_{qB}$ and $t_{qE}$ represent the beginning and end of the quiet time respectively. $h_A$ represents the channel coefficient, or the effect of the channel from the interferer to base station A. I(t) represents the signal transmitted from the interferer at time t and $n_A(t)$ represents the noise seen at base station A's receiver. When the interferer is stationary or near-stationary, the channel may be assumed to be constant across the quiet time, as well as a subsequent interference subtraction time. Those skilled in the art will recognize that depending upon the combination of the receiver type (receivers with single receive antenna or channel tap or receivers with multiple receive antennas or channel taps), the interference source type (narrowband or wideband) and the channel type (flat fading or frequency selective fading), the received signal (as well as the channel coefficient, noise and interference signal) in the Equation may have a single value or may have multi-dimensional values such as a vector or matrix. For example, consider an embodiment in which a wideband interferer source is received by an OFDM receiver in a frequency selective channel. In such an embodiment, the channel coefficient will depend upon frequency and the received signal, and the channel coefficient and the noise may be represented by vectors in the frequency domain.

Similarly, the signal at base station B during the quiet time may be expressed by the following Equation 2:

$$r_B(t_q) = h_B I(t_q) + n_B(t_q)$$ [Equation 2]

In Equation 2, $h_B$ represents the channel coefficient of the channel from the interferer to base station B and $n_B$ represents the noise seen at base station B's receiver.

Consider a scenario where the received signals (as well as the channel, noise and interference signals) have single values. When interference power is large compared to noise power, the relationship between signals at A and B may be expressed by the following Equation 3:

$$\frac{r_A(t_q)}{r_B(t_q)} \approx \frac{h_A}{h_B} = \beta_{A,B}$$ [Equation 3]

The parameter $\beta_{A,B}$ may be referred to as the channel translation parameter for base stations A and B. In a scenario where the received signals are multi-dimensional values, the channel translation parameter is also multi-valued with a value being calculated for each dimension of base station A separately. In an embodiment, the translation parameter for each dimension of base station A is calculated using a dimension of base station B. In another embodiment, the translation parameter for each dimension of base station A may be calculated using a combination of the signals received in all the dimensions of base station B.

When base station A schedules uplink transmissions at time $t_1$, which is within a coherence time for the channel ($t_{qE} < t_1 \ll t_{ct}$, where $t_{ct}$ is the coherence time for the channel), a signal received at base station A is may be expressed according to the following Equation 4:

$$r_A(t_1) = r_{A,UE}(t_1) + h_A I(t_1) + n_A(t_1)$$ [Equation 4]

In Equation 4, $r_{A,UE}(t_1)$ denotes the UE transmissions received at base station A at time $t_1$. Similarly, the signal $r_B$ received at base station B in time $t_1$ is given by Equation 5:

$$r_B(t_1) = r_{B,UE}(t_1) + h_B I(t_1) + n_B(t_1)$$ [Equation 5]

In Equation 5, $r_{B,UE}(t_1)$ denotes the signals from UE transmissions scheduled at base station A and received by base station B at time $t_1$.

UEs typically transmit at relatively low power levels. Also, since these UEs are scheduled by base station A, they may be far away from base station B. Hence, a scenario where the interferer power at B is much greater than power from the UEs (scheduled by base station A) is likely to occur in a communications network.

When the interfering signal has relatively constant transmit power, the presence of such a scenario may be ascertained by comparing the signal strength of the signal received in the quiet time with the signal received at time $t_1$: if $\|r_B(t_q)\|^2 \approx \|r_B(t_1)\|^2$, then the assertion is assumed to be true. In this scenario, assuming low noise, the majority of the signal received at base station B is a product of the interference and the channel coefficient. Put another way, $r_B(t_1) \approx h_B I(t_1)$. If a copy of the baseband signal received by base station B is made available to base station A, then a measure of the signal received from the interferer at base station A can be expressed according to the following Equation 6:

$$h_A I(t_1) \approx \beta_{A,B} r_B(t_1)$$ [Equation 6]

The copy of the baseband signal received by base station B may be digital samples of the signal captured by an analog to digital (ADC) conversion process. The reconstructed interference signal can now be subtracted from the signals received at base station A according to the following Equation 7:

$$\overline{r_A(t_1)} = r_{A,UE}(t_1) + h_A I(t_1) + n_A(t_1) - \beta_{A,B} r_B(t_1) = r_{A,UE}(t_1) + \hat{n}_A(t_1)$$ [Equation 7]

Here, $\hat{n}_A(t_1)$ captures the noise due to the interference estimation process in addition to additive white Gaussian noise (AWGN) at the receiver of base station A. In this manner, assuming sufficient interference power is seen at base station B, the effect of the interference can be effectively subtracted from the signal received at base station A.

Figure 5:
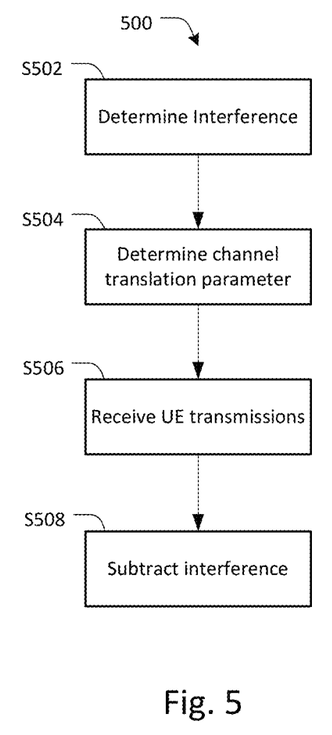
FIG. 5 illustrates a process for cooperative interference subtraction according to an embodiment.

FIG. 5 shows a process 500 of cooperative interference subtraction according to an embodiment. The embodiment of FIG. 5 is an overview, and individual components of the process will be explained in further detail with respect to other processes.

The presence of interference at more than one base station is determined at S502. Determining the presence of interference may include measuring signals during quiet times at a plurality of base stations, and detecting the presence of interference in signals received during the quiet times.

A channel translation parameter as discussed above with respect to Equation 3 is determined at S504. Determining the channel translation parameter may include sending baseband signal information from a first base station to a second base station or collecting baseband signal information received at a plurality of base stations at a central location.

Uplink transmissions from UE are received by base stations at S506. In an embodiment in which a channel translation parameter is determined for first and second base stations, the UE transmissions may be received by the first base station during a quiet time for the second base station. In another embodiment, the first and second base stations may both receive UE transmissions at S506.

Interference is subtracted from the baseband transmissions including UE data. Interference subtraction may be performed based on the channel translation parameter determined at S504 according to Equations 6 and 7, and the UE transmission may be decoded from the remaining signal component. In some embodiments, process 500 may be performed in conjunction with an interference cancellation receiver. Process 500 may be performed with cooperation between two or more antennas which detect interference from the same source.

Figure 6:
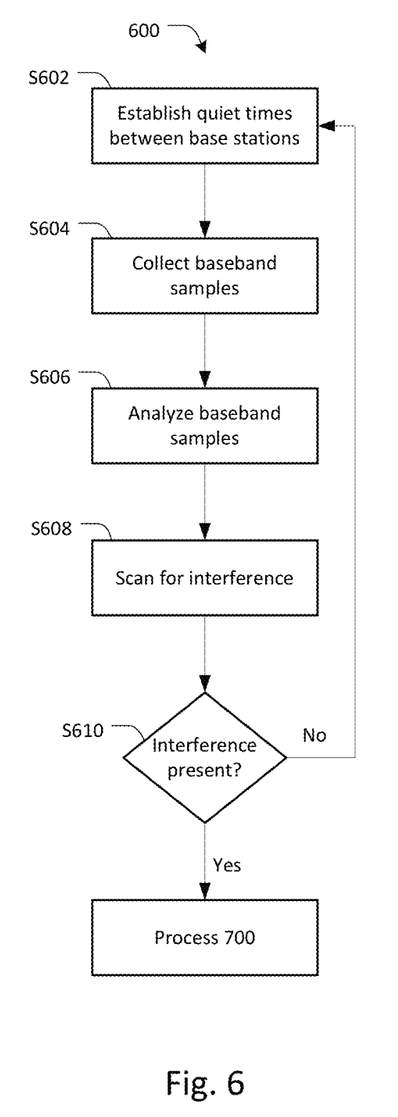
FIG. 6 illustrates a process for determining interference according to an embodiment.

FIG. 6 illustrates an embodiment of a process 600 for determining interference in a wireless communication system. Determining interference may include determining the presence of interference, as well as determining characteristics of an interference signal which may be used to calculate a channel translation parameter. A process 600 of determining interference may be performed as an automated ongoing process in a communications network, on demand, in response to performance degradation, etc.

Quiet times that are common to two or more base stations are established at S602. The two or more base stations may be base stations that are within close geographical proximity to one another and use a same portion of the frequency spectrum. A quiet time is a time in which no transmissions are scheduled for a portion of a frequency spectrum. In an embodiment, a quiet time may be a time for which no uplink transmissions are scheduled for a cell.

Quiet times occur in transmission schedules when activity levels are relatively low, for example in the early morning or in low density geographies. In higher traffic situations, quiet times may be deliberately scheduled. Examples of scheduling quiet times which may be performed at S602 are provided in U.S. application Ser. No. 14/022,654.

Baseband samples are collected at the two or more base stations during the quiet time at S604. In an embodiment, baseband samples are collected by first and second base stations during quiet times for uplink transmissions to the first and second base stations. The baseband samples are then analyzed at S606 to detect the presence of interference. Interference detection techniques that may be performed include energy detection methods, cyclostationary analysis, or even artificial intelligence algorithms performed by neural networks.

In addition or as an alternative to analyzing baseband samples, an interference scanner other than a cellular receiver may be used to scan for interference during a quiet time at S608. In an embodiment, network performance data may be analyzed to detect the presence of interference, and baseband samples are collected during quiet times at affected base stations. Techniques for detecting interference are not limited to the examples provided herein.

Figures 7, 8:
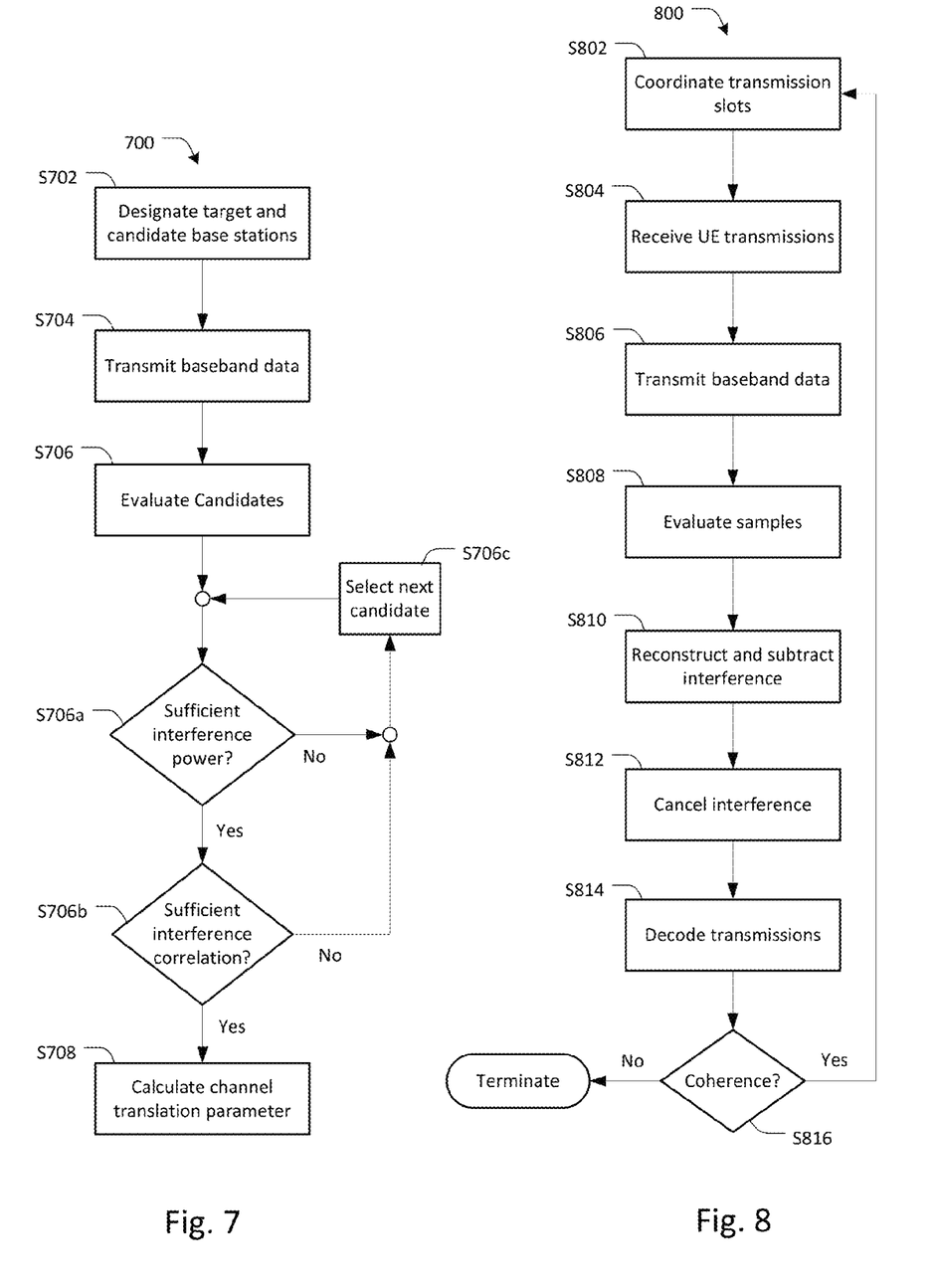
FIG. 7 illustrates a process for determining a channel translation parameter according to an embodiment.
FIG. 8 illustrates a process for scheduling transmissions and subtracting interference according to an embodiment.

The system determines whether interference is present at S610 based on results from analyzing baseband samples at S606 and/or interference scanning at S608. If the system determines that no interference is present, or that interference is only present at one base station, then aspects of the process 600 of determining interference may be repeated. If the system determines that interference is present, then a process 700 of determining a channel translation parameter may be performed.

As with all processes provided in this disclosure, aspects of process 600 may be performed in an order other than the order shown in the figure (FIG. 6). For example, scanning for interference S608 may be performed during or outside of quiet times, and when interference is determined to be present at S610, collecting baseband samples S604 may be performed.

FIG. 7 illustrates a process 700 of determining a channel translation parameter. Aspects of process 700 are explained above with respect to channel translation parameter $\beta_{A,B}$.

One or more base stations are designated as target and candidate base stations at S702. As used herein, a target base station is a first base station that cooperates in an interference subtraction scheme. A candidate base station is a base station that is being considered for cooperation with the target base station in an interference subtraction scheme as a second base station. For example, if a target base station is base station A in channel translation parameter $\beta_{A,B}$, then a candidate base station is a base station that is being evaluated for being designated as base station B.

In an embodiment, a base station which experiences degraded performance is designated as a target base station. In another embodiment, a base station which is determined to be receiving interference in process 600 is designated as a target base station. Candidate base stations may be designated based on one or more criteria such as proximity to the target base station, presence and/or level of interference, and whether the base station serves a cell that uses the same frequency and technology as the target base station.

Aspects of process 700 may be performed before, after, or concurrently with aspects of process 600. For example, in an embodiment, target and candidate base stations are determine at S702 before establishing quiet times at S602 and collecting baseband samples at S604. In one such embodiment, candidate base stations may be predetermined for a given target base station based on criteria such as geographical location, frequency, and radio access technology.

Baseband data that was collected at S604 is transmitted from receiving base stations at S704. The baseband data may be transmitted from candidate base stations to a target base station through a backhaul portion of a wireless communications system. In another embodiment, baseband samples are transmitted from the target base station and each candidate base station to a central location such as an NRC. Transmitting baseband data may include comparing an interference power to a threshold value, and only transmitting baseband data that exceeds the threshold value.

When baseband data is received at the target base station or central location, the baseband data may be evaluated for interference subtraction potential at S706. In the embodiment shown in FIG. 7, evaluating candidates includes determining whether a candidate has sufficient interference power at 706a. Determining whether a candidate base station has sufficient interference power may ensure that any increase the noise seen at the target BS ($\hat{n}_A(t_1)$) due to the interference subtraction process is within acceptable bounds.

Determining whether a candidate base station has sufficient interference power may include comparing the interference power of baseband samples from the candidate base station to a threshold value. The threshold value may be based on a level of interference power at the target base station or a predetermined value. If the candidate does not have sufficient interference power then the next candidate is selected at S706c.

When S706a determines that baseband samples from a candidate are satisfactory, process 700 may determine whether interference in the candidate baseband samples has sufficient correlation to interference in baseband samples from the target base station at S706b. A sufficient correlation may be evaluated to increase the likelihood that the candidate base station is detecting interference from the same source as the target base station.

In an embodiment, evaluating whether the correlation is sufficient may use a standard deviation of a channel translation parameter between the candidate base station and the target base station over different measurement time instances from a quiet time. In such an embodiment, a smaller standard deviation indicates greater suitability of the candidate base station for cooperating with the target base station in an interference subtraction scheme. Various embodiments may determine correlation in different ways.

Other embodiments of evaluating candidates at S706 are possible. In one embodiment, interference power and/or correlation are evaluated for a plurality of candidate base stations, and the first base station whose baseband samples satisfy comparison criteria is selected for channel translation calculation. In another embodiment, each candidate base station that satisfies comparison criteria is evaluated in subsequent processes as part of a cluster of base stations. In still another embodiment, each candidate is evaluated for interference power and/or correlation, and the highest ranked candidate for interference power and/or correlation is selected for interference subtraction with the target base station. A candidate that is successfully evaluated in S706 and is chosen for subsequent coordinated interference subtraction processes is referred to herein as a chosen base station.

A channel translation parameter is calculated between the target base station and one or more candidate base station at S708. Calculating a translation parameter may include calculating translation parameters for various time points, and calculating a mean value of the translation parameters at the time points. Translation parameters may be calculated according to Equation 3 above. In other words, calculating a translation parameter may include calculating a ratio between channels received at first and second base stations at one or more time points in a quiet time.

In an embodiment, translation parameters are calculated between the target base station and each candidate base station. In such an embodiment, translation parameters can be used to determine sufficient interference correlation at S706b. In an embodiment, the signal strength variation of the baseband samples from the chosen base station may also be calculated.

FIG. 8 shows a process 800 of scheduling transmissions and subtracting interference. Uplink transmissions to the target base station are scheduled at S802 in coordination with transmissions to one or more chosen base station. In an embodiment, coordinating transmissions includes scheduling UE transmissions to the target base station during quiet times scheduled for one or more chosen base station.

The target base stations receives transmissions from UE in the coordinated transmission slots at S804, and one or more chosen base station collects baseband data during the same time slot. In an embodiment, the primary component of the baseband data is interference, which corresponds to $h_B I(t_q)$ in Equation 2. The chosen base station sends baseband data collected during the coordinated quiet time to the target base station or other processing entity at S806. In an embodiment with more than one chosen base station, each chosen base station sends baseband data to the target base station.

In an embodiment, the chosen base station may schedule uplink UE transmissions and still send interference measurements to the target base station at S804. One such embodiment is where the external interference power at the chosen base station is such that it can successfully decode its uplink UE transmissions. This may be accomplished with or without an interference cancelling receiver. Once the UE data is decoded, the received signal from the UEs can be reconstructed and subtracted from the baseband signal that was initially received at the chosen base station. The remaining signal will now correspond to external interference received at the chosen base station and can be sent to the target base station for interference subtraction.

In an embodiment, the target base station determines whether the baseband data is usable. When received signal power from sources other than an external interferer, such as scheduled uplink transmissions, is relatively high, interference subtraction may not be sufficient to successfully decode UE transmissions. Accordingly, baseband samples received by one or more chosen base station may be evaluated at S808 to determine whether to use the samples to subtract interference from signals received by the target base station.

In an embodiment, evaluating samples at S808 includes comparing a signal strength of the baseband samples with a signal strength from samples received earlier from the chosen base station to determine a level of variation. The level of variation may in turn be compared to a predetermined value, and if the variation exceeds the predetermined value the samples are not used for interference subtraction. The predetermined value may be based on samples received at S604, such as the highest signal strength value measured during a quiet time, a mean signal strength value plus a number of standard deviations, etc. In various embodiments, the samples may be evaluated at chosen base stations when they are received, at a central location such as an NRC, or at the target base station.

The interference signal is reconstructed and subtracted from signals received by the target base station at S810 as discussed above with respect to Equation 6 and Equation 7. After interference has been subtracted from the sample, UE transmissions are then decoded at S814.

If the interfering signal has substantially even power across the quiet time and its periodicity can be captured within a processing interval, the baseband samples already available from the quiet time at the target base station may be used to construct an external interference cancellation receiver. An interference cancellation receiver may be built by constructing and averaging a second order cross-correlation matrix of the external interference across the quiet time. The interference cancellation receiver may then be used to cancel interference from UE transmissions at S812. In an embodiment, an interference cancelling receiver may employ two or more antennas and a minimum mean squared error (MMSE) calculation to boost signal levels and reduce interference.

In some situations, cooperative interference subtraction may be difficult to employ. For example, no suitable candidate base station may be identified at S706, or baseband samples from a chosen base station may not be usable. In these and other circumstances, cancelling interference at S812 may improve the quality of UE transmissions received by the target base station. In an embodiment, interference is canceled at S812 when interference subtraction at S810 is not successful.

As indicated by S816, process 800 may be repeated for a coherence time of the channel. So long as the channel is relatively constant, interference subtraction may be repeated using the same channel translation parameter. Channel coherence may be established by comparing samples used to calculate the channel translation parameter to samples collected at a chosen base station at S804. In an embodiment, process 800 is terminated after one or more unsuccessful decoding at S814 or a series of consecutive unsuccessful decodings, and process 600 and/or process 700 may be repeated. Coherence may be determined to be present when a coherence value exceeds 50%, 70%, 90% etc.

Numerous variations of process 800 are possible. For example, both the interference subtraction and interference cancellation mechanisms can be applied in parallel, and the process that results in lower bit error rates (BERs) or other receiver performance criteria can be chosen. Coordinating transmission slots at S802 for the interference subtraction scheme may reduce the number of UE transmissions that can be scheduled in order to ensure quiet times at one or more chosen base stations.

Hence, in an embodiment, if an interference cancellation scheme without subtraction is found to routinely outperform the interference subtraction scheme, interference subtraction may be suspended and only the interference cancellation scheme, which allows both the target and the chosen base station to schedule transmissions at the same time, could be used. This scenario may occur if the noise associated with the interference subtraction scheme is high or the interference signal varies substantially over time. In another embodiment, interference cancellation is not performed.

In an embodiment, after subtracting the interference signal at S810 and successfully decoding transmissions at S814, the UE transmission received by the target base station may be reconstructed and subtracted from the signal it was received in. The resulting signal reflects interference received at the target base station. This interference signal may then be used to subtract interference from signals received from a plurality of base stations that are affected by the same external interferer.

The transmission power of an external interference source may be sufficient to affect a large area, such as in the case of a radar transmitter. Accordingly, in some embodiments, a cluster of base stations that experience corresponding interference is included in a cooperative interference subtracted process. When a cluster is being analyzed, several variations to the processes described above are possible.

For example, each base station in a cluster may be scheduled to have a quiet time in the same time slot at S602, and samples from each base station in the cluster may be collected at S604. When a channel translation parameter is calculated at S708, translation parameters may be calculated for each pair of base stations in the cluster, or for a portion of pairs in the cluster such that each base station in the cluster has at least one associated channel translation parameter. In an embodiment, a single base station is designated as a chosen base station, and channel translation parameters are calculated between the designated chosen base station and each remaining base station in the cluster.

Several embodiments of scheduling transmissions at S802 are possible. In an embodiment in which a single base station is designated as a chosen base station, a quiet time may be scheduled at the chosen base station, and UE transmissions are scheduled in the same time slot for the remaining base stations. In embodiments, quiet times may be scheduled using round-robin scheduling, or based on traffic levels of base stations in the cluster for prioritization. For a given time, the base stations that did not have uplink transmissions scheduled may send their baseband data over the backhaul network to the base stations that did have uplink transmissions scheduled. Based on the quality of the received baseband data, the scheduled base stations may use the most effective baseband data from a base station or uses a combination of data from multiple base stations to reconstruct and subtract the external interferer.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for subtracting interference in a wireless communications network, the method comprising:
    receiving a first baseband signal including an interference signal at a first base station;
    receiving a second baseband signal including the interference signal at a second base station;
    calculating a channel translation parameter based on the first baseband signal and the second baseband signal;
    receiving a signal including a user equipment (UE) transmission at the first base station during a first time slot; and
    subtracting interference from the signal including the UE transmission using the channel translation parameter,
    wherein subtracting interference from the signal including the UE transmission includes:
    receiving a signal including a UE transmission at the second base station during the first time slot;
    decoding the UE transmission received at the second base station; and
    subtracting the UE transmission from the signal including the UE transmission received by the second base station to create an interference signal,
    wherein the interference subtracted from the signal received at the first base station is a result of subtracting the UE transmission from the signal including the UE transmission received by the second base station.

2. The method of claim 1, wherein the channel translation parameter is a ratio between the first baseband signal and the second baseband signal.

3. The method of claim 1, wherein subtracting interference from the signal including the UE transmission includes:
    reconstructing the interference signal by multiplying a signal received by the second base station during a quiet time for the second base station by the channel translation parameter.

4. The method of claim 1, wherein the first time slot is a quiet time for the second base station.

5. The method of claim 1, further comprising scheduling a quiet time at the first base station and the second base station, wherein the first and second baseband signals are received during the quiet time.

6. The method of claim 1, further comprising cancelling interference from the first baseband signal.

7. The method of claim 1, further comprising:
    evaluating a plurality of candidate base stations; and
    designating one of the plurality of candidate base stations as the second base station based on the results of the evaluation.

8. The method of claim 1, further comprising:
calculating a second channel translation parameter for the second base station and a third base station;
receiving a second signal from UE at the third base station; and
subtracting interference from the second received signal using the second channel translation parameter.

9. The method of claim 1, wherein subtracting the interference from the received signal is performed according to the following equation:

$$\overline{r_A(t_1)} = r_{A,UE}(t_1) + h_A I(t_1) + n_A(t_1) - \beta_{A,B} r_B(t_1) = r_{A,UE}(t_1) + \hat{n}_A(t_1)$$

in which $\hat{n}_A(t_1)$ represents noise due to the interference estimation process in addition to additive white Gaussian noise (AWGN) at the first base station, $r_{A,UE}(t_1)$ represents the signal from UE at time $t_1$, $h_A I(t_1)$ represents interference received by the first base station at time $t_1$, $n_A(t_1)$ represents noise received by the first base station at time $t_1$, $\beta_{A,B}$ is the channel translation parameter, and $r_B(t_1)$ represents a signal receive at the second base station at time $t_1$.

10. The method of claim 1, wherein the channel translation parameter is calculated according to the following equation:

$$\frac{r_A(t_q)}{r_B(t_q)} = \beta_{A,B}$$

in which $r_A$ is the first baseband signal, $r_B$ is the second baseband signal, and $\beta_{A,B}$ is the channel translation parameter.

11. An interference subtraction system for wireless communications, the system comprising:
a first base station that receives a first baseband signal including an interference signal and receives a signal including a user equipment (UE) transmission during a first time slot;
a second base station that receives a second baseband signal including the interference signal;
a processor;
a memory; and
a non-transitory computer readable medium with computer executable instructions stored thereon which, when executed by the processor, perform the following operations:
calculating a channel translation parameter based on the first baseband signal and the second baseband signal; and
subtracting interference from the signal including the UE transmission using the channel translation parameter,
wherein subtracting interference from the signal including the UE transmission includes:
receiving a signal including a UE transmission at the second base station during the first time slot;
decoding the UE transmission received at the second base station; and
subtracting the UE transmission from the signal including the UE transmission received by the second base station to create an interference signal,
wherein the interference subtracted from the signal received at the first base station is a result of subtracting the UE transmission from the signal including the UE transmission received by the second base station.

12. The system of claim 11, wherein the channel translation parameter is a ratio between the first baseband signal and the second baseband signal.

13. The system of claim 11, wherein subtracting interference from the signal including the UE transmission includes:
reconstructing the interference signal by multiplying a signal received by the second base station during a quiet time for the second base station by the channel translation parameter.

14. The system of claim 11, wherein a quiet time is scheduled at the first base station and the second base station, and wherein the first and second baseband signals are received during the quiet time.

15. The system of claim 11, wherein the operations further comprise:
evaluating a plurality of candidate base stations; and
designating one of the plurality of candidate base stations as the second base station based on the results of the evaluation.

16. A method for subtracting interference in a wireless communications network, the method comprising:
receiving a first baseband signal including an interference signal at a first base station;
receiving a second baseband signal including the interference signal at a second base station;
calculating a channel translation parameter based on the first baseband signal and the second baseband signal;
receiving a signal including a user equipment (UE) transmission at the first base station during a first time slot;
subtracting interference from the signal including the UE transmission using the channel translation parameter;
decoding the signal including the UE transmission;
reconstructing the UE transmission from the decoded signal;
subtracting the reconstructed UE transmission from the signal including the UE transmission to create a second interference signal; and
subtracting the second interference signal from a signal received at a third base station.

17. An interference subtraction system for wireless communications, the system comprising:
a first base station that receives a first baseband signal including an interference signal and receives a signal including a user equipment (UE) transmission during a first time slot;
a second base station that receives a second baseband signal including the interference signal;
a third base station that receives a third signal;
a processor;
a memory; and
a non-transitory computer readable medium with computer executable instructions stored thereon which, when executed by the processor, perform the following operations:
calculating a channel translation parameter based on the first baseband signal and the second baseband signal;
subtracting interference from the signal including the UE transmission using the channel translation parameter;
decoding the signal including the UE transmission;
reconstructing a UE transmission from the decoded signal;
subtracting the reconstructed UE transmission from the signal including the UE transmission to create a second interference signal; and subtracting the second interference signal from the third signal received at the third base station.

* * * * *